United States Patent
Donnelli et al.

(10) Patent No.: US 8,833,861 B2
(45) Date of Patent: Sep. 16, 2014

(54) LOADING ANALYSIS SYSTEM AND METHOD

(75) Inventors: Aaron Donnelli, Germantown Hills, IL (US); Andrew Whitten, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 343 days.

(21) Appl. No.: 12/959,534

(22) Filed: Dec. 3, 2010

(65) Prior Publication Data

US 2012/0143434 A1 Jun. 7, 2012

(51) Int. Cl.
*B60P 1/00* (2006.01)
*B60P 1/30* (2006.01)
*G01P 15/00* (2006.01)
*E02F 9/24* (2006.01)

(52) U.S. Cl.
CPC .. *G01P 15/00* (2013.01); *E02F 9/24* (2013.01)
USPC ........ 298/20 R; 298/17 S; 701/33.4; 701/439

(58) Field of Classification Search
CPC ........ G01P 15/00; G01G 3/16; G01G 19/415; G01G 19/08; G06F 7/00; G06T 15/00; G06T 19/00; H04N 9/47; G01C 21/28; G01C 21/165; A01B 69/007; A01B 79/005; B60P 1/00; B60P 1/30; G08G 1/22; G08G 1/164
USPC ................ 701/50, 2, 29.4, 33.4, 37, 41, 472; 702/173; 348/142; 177/1; 296/190.07; 298/19 R; 382/104; 37/197; 414/809
See application file for complete search history.

(56) References Cited

U.S. PATENT DOCUMENTS

| | | | |
|---|---|---|---|
| 5,531,122 A | 7/1996 | Chatham et al. | |
| 5,650,930 A * | 7/1997 | Hagenbuch | 701/50 |
| 5,832,730 A | 11/1998 | Mizui | |
| 5,847,658 A | 12/1998 | Irie et al. | |
| 5,973,273 A * | 10/1999 | Tal et al. | 177/1 |
| 6,643,587 B2 * | 11/2003 | Brodie et al. | 701/472 |
| 6,898,501 B2 * | 5/2005 | Schubert | 701/50 |
| 7,076,348 B2 * | 7/2006 | Bucher et al. | 701/29.4 |
| 7,138,913 B2 | 11/2006 | Mackenzie et al. | |
| 7,188,042 B2 | 3/2007 | Havens | |
| 7,210,356 B2 | 5/2007 | Bernhagen | |
| 7,744,149 B2 * | 6/2010 | Murray et al. | 296/190.07 |
| 7,756,622 B2 * | 7/2010 | Gianoglio et al. | 701/50 |
| 7,813,854 B2 * | 10/2010 | Liaw et al. | 701/41 |
| 8,065,054 B2 * | 11/2011 | Tarasinski et al. | 701/37 |
| 8,113,763 B2 * | 2/2012 | Hagenbuch et al. | 414/809 |

(Continued)

FOREIGN PATENT DOCUMENTS

| | | |
|---|---|---|
| JP | 06082295 | 3/1994 |
| JP | 2001271873 | 10/2001 |
| JP | 2006001292 | 1/2006 |

*Primary Examiner* — Tuan C. To
*Assistant Examiner* — Yuri Kan
(74) *Attorney, Agent, or Firm* — Leydig, Voit & Mayer, Ltd.

(57) ABSTRACT

A machine includes a frame and a dump body. An electronic controller is operably connected to the machine. At least one accelerometer is disposed to measure an acceleration of the frame and/or the dump body, and to provide an acceleration signal to the electronic controller. The electronic controller is disposed to receive and analyze the acceleration signal and provide a loading signal indicative of a severe loading condition to a remote control station and/or a loading machine performing the loading.

14 Claims, 4 Drawing Sheets

(56) References Cited

U.S. PATENT DOCUMENTS

| | | | |
|---|---|---|---|
| 2003/0040885 A1* | 2/2003 | Schoess et al. | 702/173 |
| 2008/0243344 A1 | 10/2008 | Casey et al. | |
| 2009/0222176 A1 | 9/2009 | Florean et al. | |
| 2010/0188503 A1* | 7/2010 | Tsai et al. | 348/142 |
| 2010/0256836 A1* | 10/2010 | Mudalige | 701/2 |
| 2010/0327649 A1* | 12/2010 | Kvist et al. | 298/19 R |
| 2012/0114181 A1* | 5/2012 | Borthwick et al. | 382/104 |
| 2012/0174445 A1* | 7/2012 | Jones et al. | 37/197 |

* cited by examiner

LOADING ANALYSIS SYSTEM AND METHOD

TECHNICAL FIELD

This patent disclosure relates generally to payload carrying vehicles and, more particularly, to vehicles configured to carry payloads of heavy aggregate materials such as those used, for example, in surface mining operations.

BACKGROUND

Certain applications, such as strip mining, involve the transportation of aggregate material, such as ore, from a mining site to a processing or shipping facility. Typical mining operations use haul trucks that carry the extracted material to a central location. These haul trucks may perform hundreds of trips daily as some mining operations operate around the clock. The loading of the aggregate material onto the haul trucks is typically accomplished by use of wheeled loaders or excavators.

A typical loading operation includes filling a bucket of the loader machine with a load, and depositing the load from above into the dump body of the haul truck. As can be appreciated, considerable impact stresses may be imparted onto the haul truck depending on the loading height, density of the aggregate, and consistency of the aggregate. For example, a bucket load that contains boulders can induce stresses on the haul truck if dropped from a high distance over the dump body. Additionally, aggregate dropped suddenly may also cause unwanted stresses to the dump body and its mounting elements.

Such relatively high vibration and impact loading that can occur during loading of the haul truck can be detrimental to the longevity of truck components and, if excessive, can cause damage to the haul truck. Traditionally, a haul truck operator will perceive excessive load and vibration that may be caused during loading and notify the loader operator. However, depending on the training and experience of the haul truck operator, the operator's perception of the severity of the loading is a subjective measure that may insufficient to detect and correct loading practices that may damage the haul truck. Moreover, the contemplation of autonomous haul trucks lacking operators will remove the operator from the truck during loading and the determination of loading severity may be made by the operator of the loading machine, who is not very well positioned to determine the condition of the haul truck during loading.

SUMMARY

The disclosure describes, in one aspect, a machine. The machine includes a frame and a dump body. An electronic controller is operably connected to the machine. At least one accelerometer is disposed to measure an acceleration of the frame and/or the dump body, and to provide an acceleration signal to the electronic controller. The electronic controller is disposed to receive and analyze the acceleration signal and provide a loading signal indicative of a severe loading condition to a remote control station and/or a loading machine performing the loading.

In another aspect, the disclosure describes a loading analysis system for a vehicle adapted for loading of aggregate material by a loader machine. The vehicle includes an autonomous navigation and control system that is in wireless communication with a control station and/or the loader. The loading analysis system includes a vehicle controller operably connected to the vehicle. A loader controller is operably connected to the loader. At least one accelerometer is disposed to measure an acceleration of the vehicle and to provide an acceleration signal to the vehicle controller. The vehicle controller is disposed to receive and analyze the acceleration signal, and to provide a loading signal indicative of a severe loading condition to the loader controller. The loader controller is disposed to provide a notification to the operator of the loader that a severe loading condition has occurred in response to receipt of the loading signal.

In yet another aspect, the disclosure describes a method of analyzing a loading condition of an autonomous haul truck. The method includes determining whether the autonomous haul truck is being loaded based, at least in part, on information indicative of a location of the autonomous haul truck. An acceleration of the autonomous haul truck is monitored while the autonomous haul truck is stationary and being loaded. A loading signal is provided when the autonomous haul truck is being loaded and the monitored acceleration indicates that an excessive vibration is present. The loading signal is communicated to a loader performing the loading, and a notification is provided to an operator of the loader that the excessive vibration is present as an indication of a severe loading condition.

DETAILED DESCRIPTION

In the description that follows, an exemplary embodiment of an autonomous haul truck is used for sake of description as this represents an application that can benefit from the advantages of the disclosed system and method. The particular haul truck illustrated and described is one suited for mining applications, although other applications having less severe loading characteristics are contemplated. Moreover, the disclosed system and method may be used in haul trucks and other vehicles that are not autonomously controlled, i.e., that include operators capable of perceiving the loading conditions of their vehicle. Even in those applications, implementation of the disclosed system and method may advantageously provide to the vehicle or machine owner and/or, in one embodiment, the operator of the loader machine, an objective criterion on the loading condition of the vehicle such that accepted parameters are not exceeded.

Figure 1:
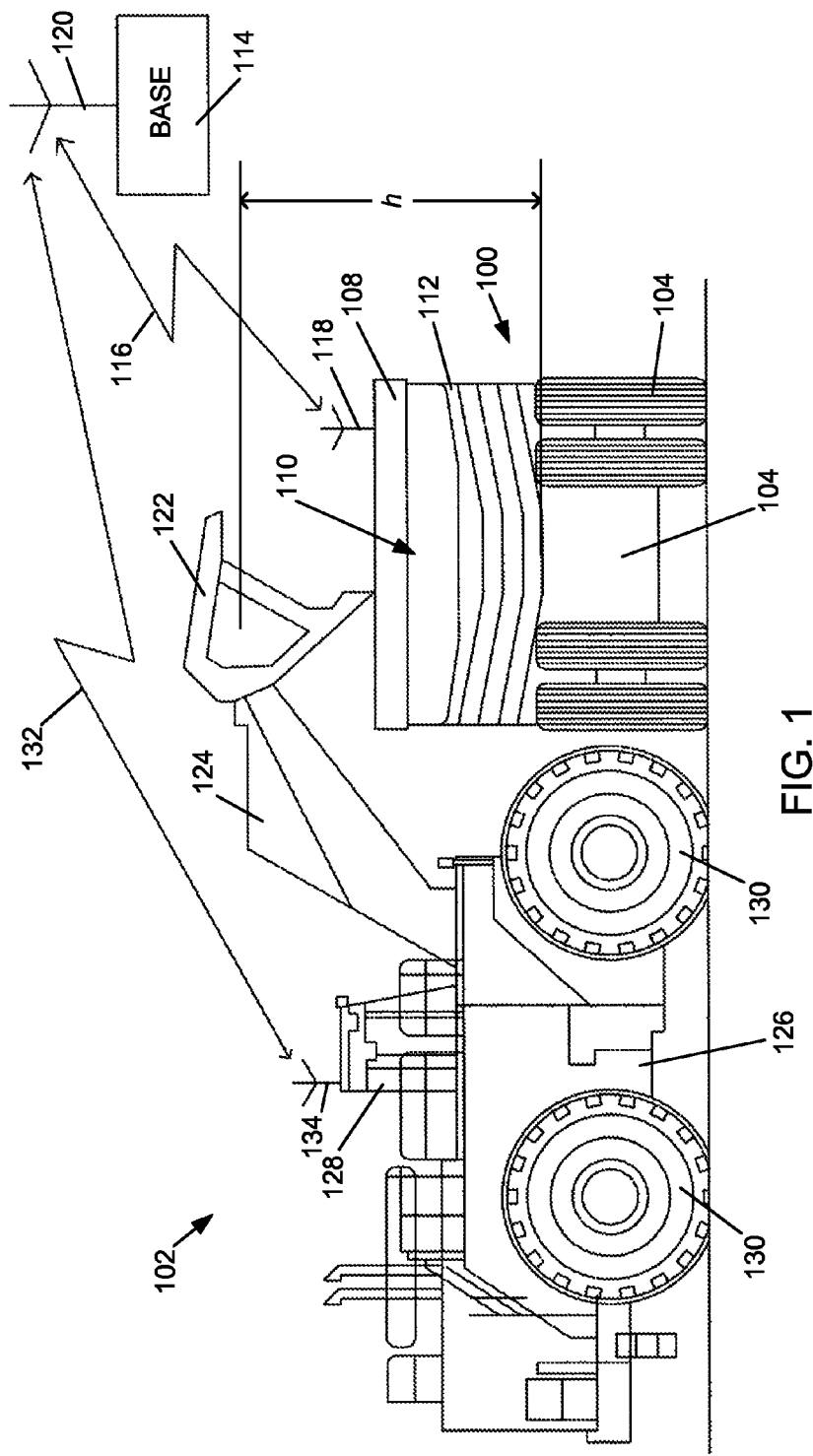
FIG. 1 is a schematic view of a haul truck in accordance with the disclosure during a loading operation.

FIG. 1 is an outline view of a haul truck 100 during loading by a loader 102. The haul truck 100 is shown from a rear perspective and includes a frame 104 having wheels 106. The haul truck 100 includes a dump body 108 that forms a cavity 110 into which a payload of aggregate material may be loaded. Walls 112 surround the cavity 110 to contain the payload during transport.

The haul truck 100 in the illustrated embodiment is an autonomous haul truck that receives motion and other function commands from a base station 114. The base station 114 may be locally situated at a mining site, or may alternatively be remotely located. Communication signals 116 may be exchanged between the base station 114 and the haul truck 100 wirelessly, for example, by use of radio or other electromagnetic digital or analog transmission. The haul truck 100 in the illustrated embodiment includes an antenna 118 that exchanges the communication signals 116 with an antenna 120 of the base station 114. The communication signals 116 are two-way signals that can carry commands to the haul truck 100 from the base station 114 as well as inform the base station 114 of messages sent by the haul truck 100.

The loader 102 is shown having a bucket 122 disposed in a loading position over the dump body 108. The bucket 122 is pivotally connected at the end of a boom 124, which is pivotally connected to a frame 126 of the loader 102. During operation, an operator occupying a cab 128 of the loader 102 will move the bucket 122 into position to be filled with material. The loader 102 moves, for example, on wheels 130, but other ground engagement members are contemplated. The filled bucket 122 is then moved over the dump body 108 and over the edge walls 112 for emptying the bucket load into the dump body. The emptying of the bucket 122 is accomplished by tilting the bucket downwards such that the bucket load may fall into the cavity 110 of the dump body 108.

Various parameters may be considered when determining the severity of the loading of the haul truck 100. For example, a height, h, between a center of gravity of the loaded bucket 122 and the bottom of the dump body 108 can influence the force with which the bucked load is dropped onto the haul truck 100. Moreover, the rate of rotation of the bucket 122 relative to the boom 124 when dumping the bucket load into the dump body 108 may affect the rate of deposition of material onto the haul truck 100, which may in turn affect the loading on the various components of the haul truck 100. The composition of the aggregate material may also affect the loading on the haul truck 100, which may increase, for example, if boulders or other heavy objects are present in the bucket load. These and other parameters can be evaluated and typically compensated for by the operator of the loader 102, especially if feedback to the operator is provided by the operator of the haul truck 100. However, the feedback from the haul truck 100 operator may be based on the operator's subjective perception and, in certain applications, may not even be available if the haul truck lacks an operator and is instead autonomously operated.

In an autonomous haul truck 100 in accordance with one embodiment of the disclosure, a loading analysis system is configured to detect and diagnose severe loading conditions. An appropriate signal may be provided via an a communication signal 116 to the base 114, which will in turn provide a signal 132 to the loader 102. The loader 102 is configured to receive the signal 132 via an antenna 134, and process the signal to provide an indication to the operator of the loader 102 that the loading of the haul truck 100 is severe such that corrective action may be taken.

Figure 2:
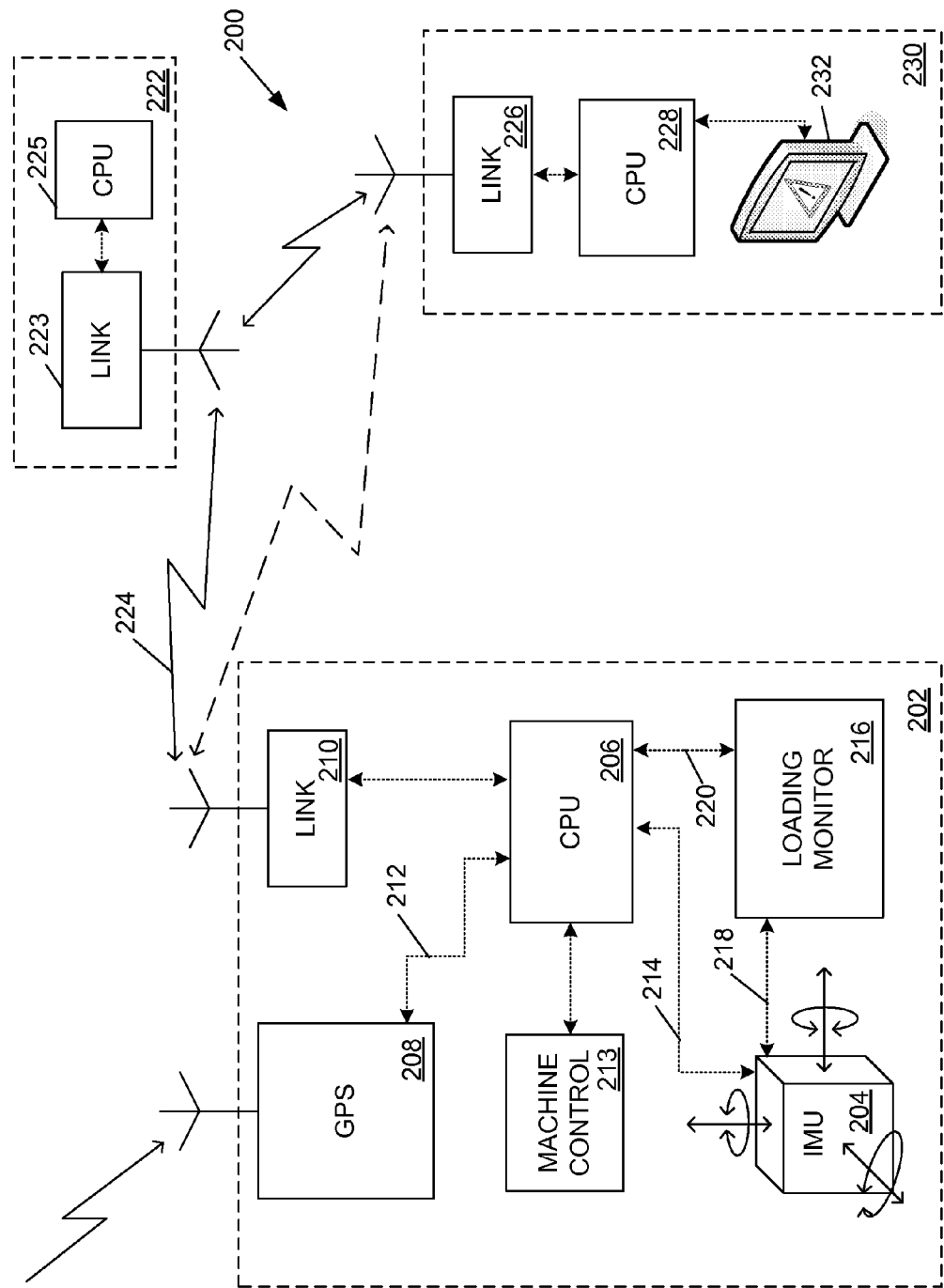
FIG. 2 is a block diagram of a loading analysis system in accordance with the disclosure.

A block diagram of a loading system 200 is shown in FIG. 2. As shown, the system 200 includes various subsystems that cooperate and communicate with one another to determine severe loading conditions and provide information indicative of the severe loading condition to the operator of a loader and/or to a base or control station such that corrective action may be timely implemented. More particularly, the system 200 includes a vehicle-born loading analysis and navigation sub-system 202.

As previously discussed, the haul truck in the illustrated embodiment is an autonomously controlled haul truck, which includes systems dedicated to the navigation and control of the vehicle. Although these navigation and control systems are beyond the scope of the present disclosure, relevant to the present disclosure they include an inertia measuring unit (IMU) 204, a central processing unit (CPU) 206, and a global positioning system (GPS) 208. These basic components, together with a wireless communication interface or link 210, are configured to enable the haul truck's autonomous navigation and motion around a worksite. During operation, the GPS 208 may provide positional information to the CPU 206 via a GPS-communication line 212. The CPU 206 may compare the information received from the GPS 208 with the desired location of the machine, as well as with a predetermined route, and appropriately command the various machine systems, such as propulsion, steering, braking, and others, which are generically represented by machine control block 213, to effect the motion of the machine towards a desired location along a desired route. During motion, the IMU 204 may provide feedback information to the CPU 206 via an IMU-communication line 214 that is indicative of the motion of the machine.

In the illustrated embodiment, the IMU 204 is an electronic device that can measure and provide signals indicative of a vehicle's velocity and orientation using a combination of accelerometers and gyroscopes. While IMUs are typically used to maneuver aircraft, their capability to determine speed and orientation of a moving vehicle makes them useful in the navigation of land vehicles because they allow the CPU 206 to track the vehicle's position and ensure that, for example, the proper destination is reached using a desired route. Relevant to the present disclosure, however, the IMU's 204 accelerometers are also useful in measuring vibration as an indication of excessive loading.

Accordingly, the IMU includes three gyroscopes and three accelerometers, which are together configured to measure acceleration along three orthogonal axes as well as measure the pitch, yaw and roll of the vehicle. It is contemplated that each of these six degrees of freedom can be used in determining the severity of a loading condition of a vehicle when an IMU is available as will be hereinafter discussed in more detail. Alternatively, only the three or fewer than three accelerometers may be used.

Information indicative of the vibration and orientation changes experienced by the haul truck, such as rocking during loading, is measured by the IMU 204 and provided to a loading monitor 216 via a communication line 218. The information on the communication line 218 may advantageously include signals indicative of motion in each of the six degrees of freedom that the IMU 204 can provide, or may alternatively consist of as little as a single acceleration signal provided by a single accelerometer, for example, measuring acceleration along a generally vertical axis. The loading monitor 216 may determine whether severe loading is occurring, and provide an appropriate signal to the CPU 206 via a loading-communication line 220. Although the loading monitor 216 is shown as a block separate from the CPU 206, it is contemplated that the functionality of the loading monitor 216 may be integrated or added to the programs and algorithms operating within the CPU 206 and that the information provided on the line 218 interconnecting the IMU 204 with the loading monitor 216 may be taken from the information already provided on line 214 interconnecting the IMU 204 with the CPU 206.

At times when the loading monitor 216 provides information or signals indicative of severe loading conditions to the CPU 206, the CPU 206 may first conduct a determination of whether the vehicle, for example, the haul truck 100, is in a loading position. In other words, the accelerometers of the IMU 204 may detect excess vibration, which although may be indicative of a severe loading condition while a loading the vehicle, may occur otherwise during motion of the machine, for example, over rough terrain.

When the vehicle is being loaded and the loading monitor 216 provides an indication to the CPU 206 that severe loading has occurred, the CPU 206 may provide a signal indicative of the severe loading along with, optionally, specific parameters of the severe loading detected, to a base unit or central control 222 via a control communication channel 224 via the wireless link 210. The signal may be received by a wireless link 223 and evaluated by a CPU 225 of the central control 222, which is configured to generate a signal indicative of the severe loading that is sent to the machine performing the loading. Alternatively, the CPU 206 may provide a signal directly to the wireless link 226 connected to a CPU 228 operating in a loader sub-system 230 associated with the loader machine performing the loading.

When a signal is received at the loader sub-system 230 that a severe loading condition has occurred, the CPU 228 of the loader sub-system 230 may display a warning or information message on a display 232 that is viewable by the operator. In alternate embodiments, the CPU 228 of the loader sub-system may further take mitigating measures, such as limiting the rate of rotation of the loading device, for example, the bucket 122 (FIG. 1), the height h (FIG. 1), and the like.

Figure 3:
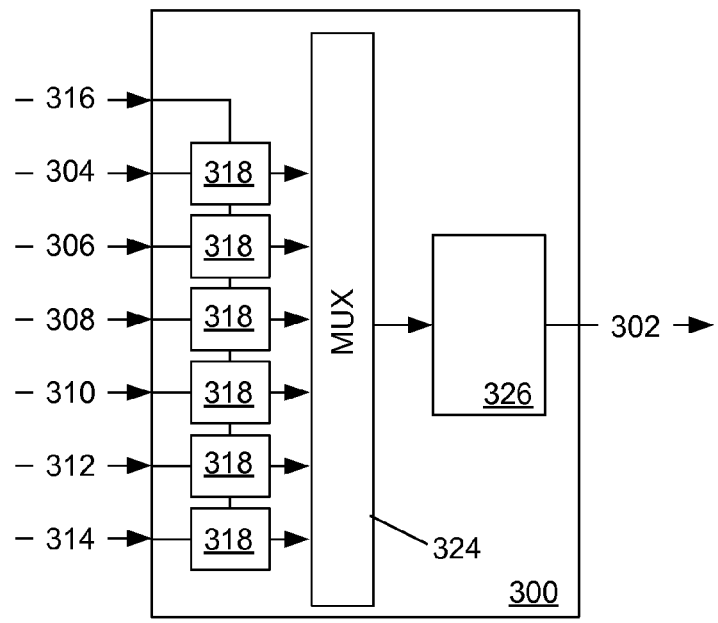
FIG. 3 is a functional diagram for a controller for use in a loading system in accordance with the disclosure.
Figure 4:
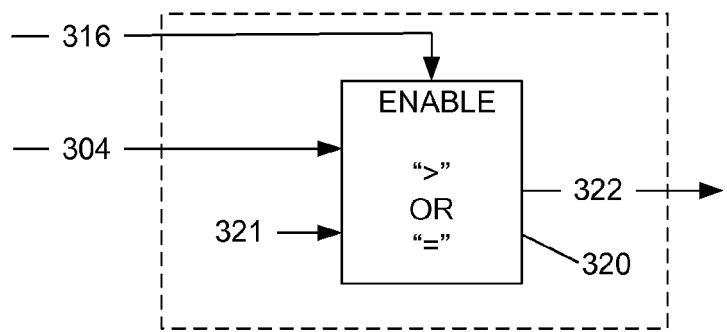
FIGS. 4 and 5 are two alternative views of a loading calculator in accordance with the disclosure.
Figure 5:
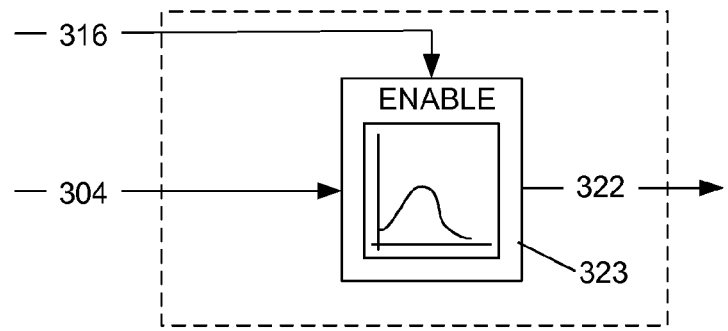

A few particular implementations of algorithms that may operate within the loading monitor 216 or its equivalents are shown in FIGS. 3-5. FIG. 3 is a high-level representation of one embodiment for determining that a severe loading condition has occurred. Accordingly, a load monitoring module 300 may be configured to receive various inputs from other machine systems, which are processed to provide a severe loading signal 302. The inputs include a signal from each of six sensors measuring acceleration along and rotation about each of three orthogonal axes, for example, X, Y and Z. In one embodiment, the X axis extends along the longitudinal axis of the vehicle and is aligned with the direction of travel when the vehicle moves forward, the Y axis extends horizontally perpendicular to the X axis, and the Z axis is vertical when the vehicle is resting on a flat surface. Accordingly, the load monitoring module 300 may receive acceleration signals $\alpha_X$ 304, $\alpha_Y$ 306 and $\alpha_Z$ 308 indicative respectively of acceleration detected along the X-axis, Y-axis and Z-axis, and rotational displacement signals $\omega_X$ 310, $\omega_Y$ 312 and $\omega_Z$ 314 that are indicative, respectively, of rotational motion detected about the X-axis, Y-axis and Z-axis.

The load monitoring module 300 may further receive an enable flag 316, which may be a digital value of 1 or 0 where a value of 1 indicates or is active when the vehicle is in a loading position. The enable flag 316 may be provided to each of six analysis routines 318, each of which is configured to receive the respective signal provided to the module 300 and analyze whether a severe loading is indicated based on that respective parameter alone. Although six such routines 318 are shown corresponding to each of the six input signals of acceleration and rotational motion, fewer than six routines may be used when fewer corresponding input signals are provided. Moreover, the processing of one or more input signals indicative of acceleration or rotational motion may be integrated into a single such routine.

One embodiment of an analysis routine 318 is shown in FIG. 4, and an alternative embodiment is shown in FIG. 5. In the embodiment shown in FIG. 4, the routine 318 receives the enable signal 316 and an input parameter, for example, the $\alpha_X$ 304 which represents the magnitude of acceleration along the X-axis. The magnitude of $\alpha_X$ 304 is compared to a threshold limit 321 that is applicable to that particular parameter. When the enable flag 316 is active and when the magnitude of $\alpha_X$ 304 is at least equal to the threshold limit 321, a comparator function 320 may provide a signal 322 indicative of excessive vibration (or rotation, as applicable) in the particular direction being monitored. In an alternative embodiment, a statistical function 323 may provide the signal 322 when acceleration having a magnitude that is greater than an expected magnitude is detected.

In one embodiment of this alternative embodiment, the function 323 may include a model-based algorithm or a statistical accumulation of historical data, such as a histogram. A histogram is a graphical representation showing a visual impression of the distribution of experimental data and represents an estimate of the probability distribution of a continuous variable. In this way, the function 323 may be "trained" to the expected or normal severity levels for a particular application over a period. Thereafter, the function 323 may compare the detected magnitudes during any particular loading operation with the magnitudes that have occurred in the past to determine whether the detected magnitudes are more severe than those considered normal.

Returning now to FIG. 3, the various signals 322 from each of the parameters being monitored are provided to a multiplexer 324, which in turn provides them to a logic function 326. Although in one embodiment a determination of severe loading may be made based on any single parameter, the logic function 326 may look for patterns in the parameters being detected such that false indications of severe loading are avoided. For example, the logic function 326 may declare a severe loading condition when more than one parameters are exhibiting increased values at the same time. The various parameters are selected based on known responses of the vehicle to a severe loading condition. In one example, an overloading condition may exhibit acceleration in the Z axis coupled with rocking or rotational translation about the X axis. These and other relationships indicative of a particular type of severe loading may be coded into and combined in the logic function 326, for example, using AND/OR gates based on the presence of the various signals 322.

While the arrangement illustrated and discussed herein is in connection with a haul truck used for mining applications, it has universal applicability in various other types of other machines as well. The term "machine" may refer to any machine that performs some type of operation associated with an industry such as mining, construction, farming, transportation, or any other industry known in the art. For example, the machine may be an earth-moving machine, such as a wheel loader, excavator, dump truck, backhoe, motor grader, material handler or the like. Moreover, an implement may be connected to the machine. Such implements may be utilized for a variety of tasks, including, for example, loading, compacting, lifting, brushing, and include, for example, buckets, compactors, forked lifting devices, brushes, grapples, cutters, shears, blades, breakers/hammers, augers, and others.

INDUSTRIAL APPLICABILITY

The present disclosure is applicable to vehicles or other machines configured to transport a payload, such as an aggregate material, that is loaded onto the vehicle by a loader machine. It will be appreciated that the foregoing description provides examples of the disclosed system and technique. However, it is contemplated that other implementations of the disclosure may differ in detail from the foregoing examples.

Figure 6:
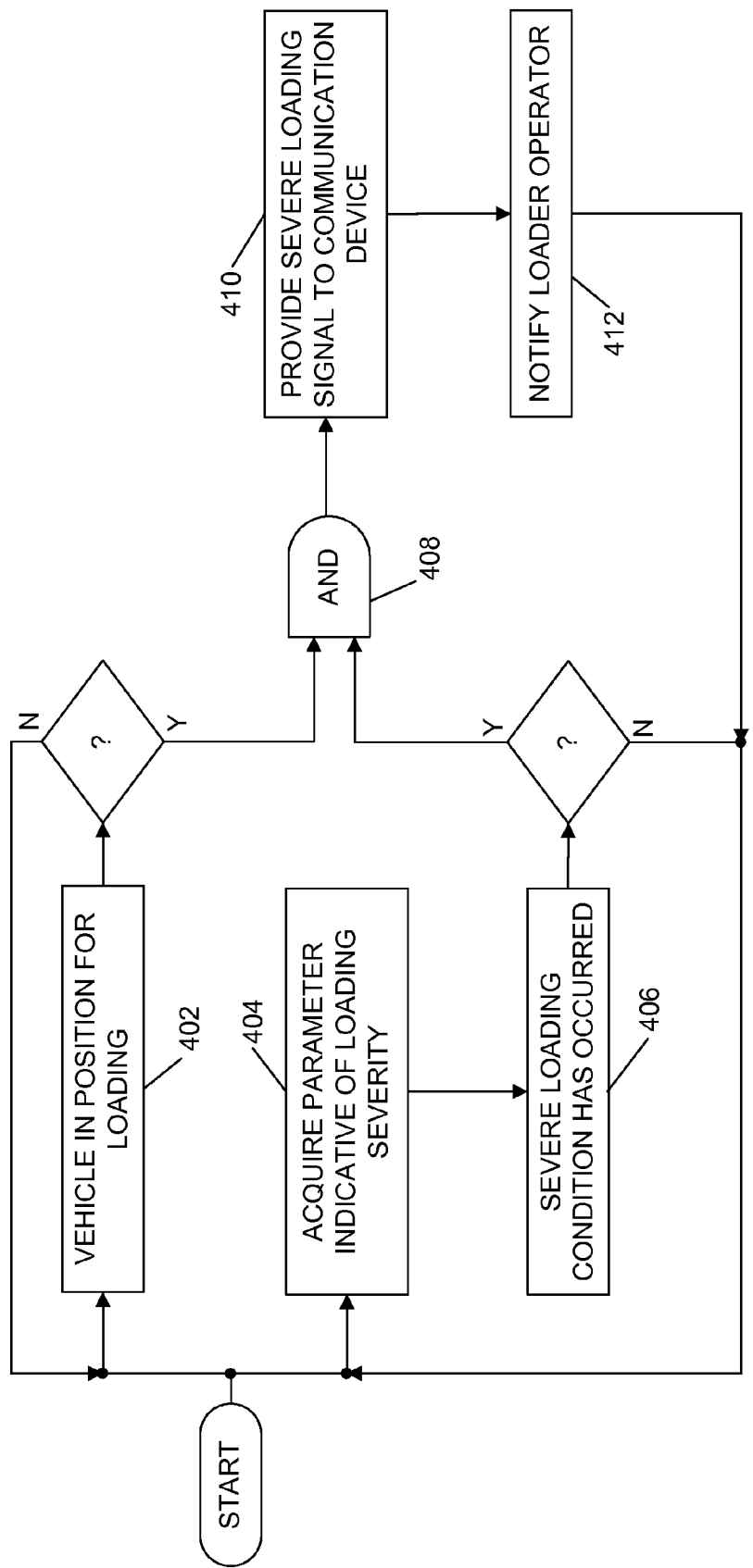
FIG. 6 is a flowchart for a method for analyzing loading in accordance with the disclosure.

A flowchart for a method of analyzing the loading of a haul truck or other similar vehicle or machine is shown in FIG. 6. The method includes determining whether the vehicle is in position for loading at 402. At least one parameter indicative of loading severity is acquired at 404. In one embodiment, parameters indicative of loading severity may be provided by accelerometers and/or gyroscopes, such as those that may be found in an IMU device. The at least one parameter is analyzed at 406 to determine whether a severe loading condition has occurred. The analysis at 406 may provide a signal indicative that a severe loading has occurred, for example, when excessive vibration and/or rocking of the machine has occurred as indicated by the various parameters being analyzed. In one embodiment, the signal is provided in response to at least one parameter providing an indication that a threshold, such as a vibration threshold, has been exceeded. In alternative embodiments, the determination may be based on the presence of a particular combination or coincidence of excessive values in more than one parameter, such as a vibration in more than one directions or a vibration that coincides with a rocking motion. A check is performed at 408 to determine whether the vehicle is in a loading position and whether a signal indicative of a severe loading is present.

When the check at 408 indicates that the vehicle is in a loading position and that a severe loading has occurred, a signal is provided that a severe loading is present at 410. The signal at 410 may be provided to a communication device. The communication configuration at 410 may include a wireless connection to a control station and/or a loading machine performing the loading of the vehicle. In embodiments where the signal is provided to the control station, the control station may relay or generate a new signal that is directed to the machine performing the loading of the vehicle that provided the indication that a severe loading has occurred.

The machine performing the loading is configured to receive the signal from the vehicle being loaded and/or the control station, and provide a notification to an operator at 412 that the loading parameters that led to the severe loading condition should be evaluated. The notification at 412 may be accomplished in any suitable fashion including providing a visual indication on a display and/or an audible alarm to alert the operator. In alternative embodiments, the loader may be further configured to mitigate the severe loading condition in response to receipt of the severe loading notification from the vehicle being loaded and/or the control station by, for example, implementing limits to the operation of a loading implement, such as setting a maximum drop height for the deposition of a load to the vehicle, setting a maximum rate at which a load may be loaded onto the vehicle, and the like.

All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context.

We claim:

1. A machine, comprising:
    a frame;
    a dump body connected to the frame;
    an electronic controller operably connected to the machine;
    an inertial measuring unit (IMU) including at least one accelerometer disposed to measure an acceleration of at least one of the frame and the dump body and to provide an acceleration signal to the electronic controller, and at least one gyroscope disposed to measure a rotation of the frame and the dump body and to provide a rotation signal to the electronic controller;
    a global position system (GPS) unit disposed to determine a position of the machine and to provide a position signal to the electronic controller;
    wherein the electronic controller is disposed to receive and analyze the acceleration signal, the rotation signal and the position signal, to determine whether the machine is stationary and being loaded with cargo based on the position signal, and to provide a loading signal indicative of vibration based on the acceleration signal and rotational motion based on the rotation signal of the dump body only when the electronic controller determines that the machine is stationary and being loaded;
    wherein the loading signal indicates that the vibration and rotational motion of the machine each exceeds a respective predetermined threshold when a force with which a load is dropped onto the dump body and/or a rate of deposition of material into the dump body are excessive while the machine is stationary and the dump body is being loaded with cargo, said loading signal being provided by the electronic controller to at least one of a remote control station and a loading machine, the loading machine performing the loading, such that the vibration and rotational motion of the dump body can be controlled by controlling a loading process of the machine.

2. The machine of claim 1, further comprising a wireless communication device disposed on the machine and operably associated with the electronic controller, wherein the wireless communication device is configured to receive the loading signal from the electronic controller and send the loading signal to the at least one of the remote control station and the loading machine.

3. The machine of claim 1, further including two additional accelerometers for a total of three accelerometers, each of the three accelerometers being configured to measure a corresponding acceleration along one of three axes, the three axes being disposed in orthogonal relation to one another.

4. The machine of claim 3, wherein the electronic controller is disposed to receive two additional acceleration signals.

5. The machine of claim 3, further comprising two additional gyroscopes for a total of three gyroscopes, each gyroscope being configured to measure a rotational motion along a corresponding one of the three axes and provide a signal indicative of a rotational displacement to the electronic controller.

6. The machine of claim 5, wherein the electronic controller is disposed to provide the loading signal based on a combination of more than one acceleration signal.

7. A loading analysis system for a vehicle adapted for loading of aggregate material by a loader machine, the vehicle including an autonomous navigation and control system that is in wireless communication with a control station and/or the loader, the loading analysis system comprising:
    a vehicle controller operably connected to the vehicle;
    a loader controller operably connected to the loader;
    at least one accelerometer disposed to measure an acceleration of the vehicle and to provide an acceleration signal to the vehicle controller;
    at least one gyroscope disposed to measure a rotation of the vehicle and to provide a rotation signal to the vehicle controller;
    a global position system (GPS) unit disposed to determine a position of the vehicle and to provide a position signal to the vehicle controller;

wherein the vehicle controller is disposed to receive and analyze the acceleration signal, the rotation signal and the position signal, to determine whether the vehicle stationary and being loaded with cargo based on the position signal, and to provide a loading signal indicative of vibration based on the acceleration signal and rotational motion based on the rotation signal of the vehicle only when the vehicle controller determines that the vehicle is stationary and being loaded;

wherein the loading signal indicates that the vibration and rotational motion of the machine each exceeds a respective predetermined threshold when a force with which a load is dropped onto the vehicle and/or a rate of deposition of material into the vehicle are excessive while the vehicle is stationary and being loaded with cargo, and wherein the loader controller is disposed to provide a notification to the operator of the loader that a severe loading condition has occurred in response to receipt of the loading signal such that a severity of the loading process can be controlled.

8. The loading analysis system of claim 7, further comprising:
a vehicle communication device disposed on the vehicle and operably associated with the vehicle controller;
a loader communication device disposed on the loader and operably associated with the loader controller;
wherein the loading signal is communicated wirelessly between the vehicle and loader communication devices.

9. The loading analysis system of claim 7, further including two additional accelerometers for a total of three accelerometers disposed on the vehicle, each of the three accelerometers being configured to measure a corresponding acceleration along one of three axes, the three axes being disposed in orthogonal relation to one another.

10. The loading analysis system of claim 7, wherein the vehicle controller is disposed to receive two additional acceleration signals.

11. The loading analysis system of claim 9, further comprising two additional gyroscopes for a total of three gyroscopes, each gyroscope being configured to measure a rotational motion along a corresponding one of the three axes and provide a signal indicative of a rotational displacement to the vehicle controller.

12. The loading analysis system of claim 11, wherein the vehicle controller is disposed to provide the loading signal based on a combination of more than one acceleration signal and more than one rotation signal.

13. A method of analyzing a loading condition of an autonomous haul truck, the method comprising:
using an electronic controller to determine whether the autonomous haul truck is stationary and in a loading position where the autonomous haul truck is being loaded based at least in part on information indicative of a location of the autonomous haul truck;

monitoring with the electronic controller an acceleration, a rotational motion, and a position of the autonomous haul truck while the autonomous haul truck is stationary and being loaded to determine a vibration and/or a rotational motion of the haul truck, which vibration and/or rotational motion result from a force with which a load is dropped into the autonomous haul truck and/or a rate of deposition of material onto the haul truck while the truck is stationary and being loaded;

providing via the electronic controller a loading signal based on the acceleration, position, and rotational motion when the autonomous haul truck is being loaded and the monitored acceleration and rotational motion together indicate that an excessive vibration and/or an excessive rotational motion is/are present while the vehicle is stationary and in the loading position;

communicating the loading signal from the electronic controller to a loader performing the loading; and providing a notification to an operator of the loader that the excessive vibration and/or the excessive rotational motion is/are present as an indication of a severe loading condition.

14. The method of analyzing a loading condition of claim 13, wherein communicating the loading signal to the loader is accomplished by providing the loading signal from the autonomous haul truck to a remote control station, and relaying the loading signal from the remote control station to the loader.

* * * * *